Aug. 11, 1931.　　G. H. ROSSEBO ET AL　　1,818,276
POP CORN MACHINE
Filed May 10, 1930　　2 Sheets-Sheet 1
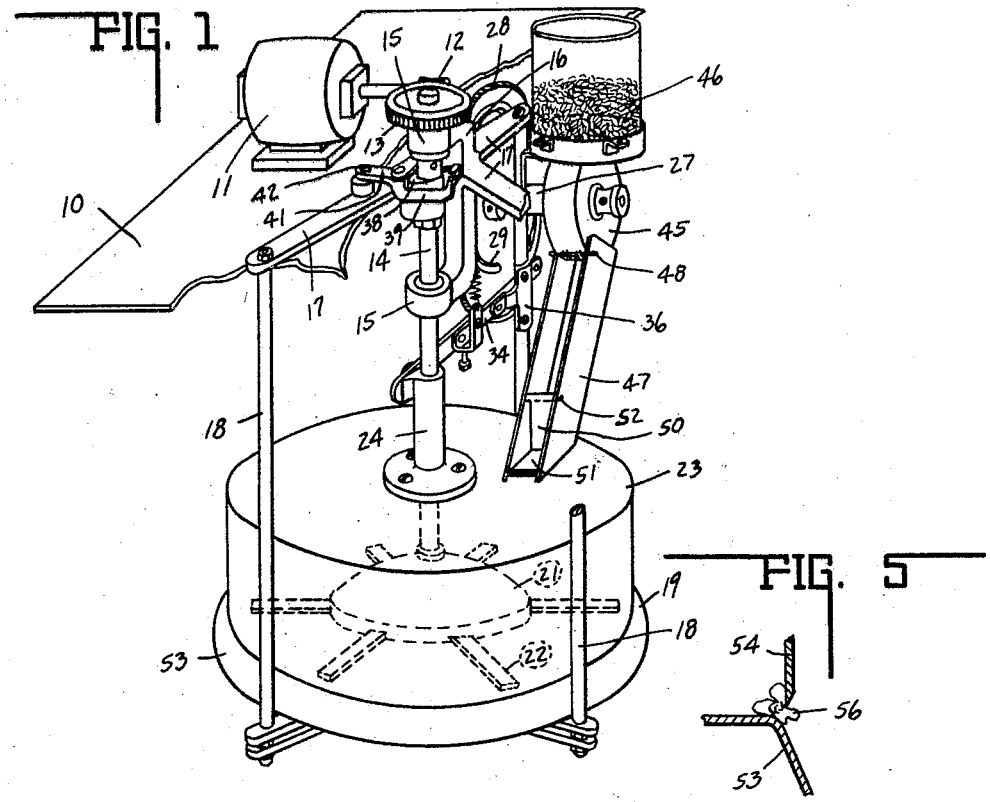
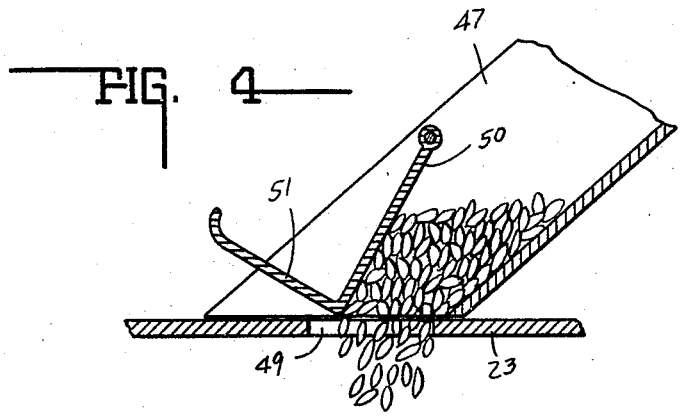
INVENTORS.
GEORGE H. ROSSEBO
FRANK HOKE.
BY
Lockwood Lockwood Goldsmith & Gast.
ATTORNEYS.

Aug. 11, 1931.  G. H. ROSSEBO ET AL  1,818,276
POP CORN MACHINE
Filed May 10, 1930    2 Sheets-Sheet 2
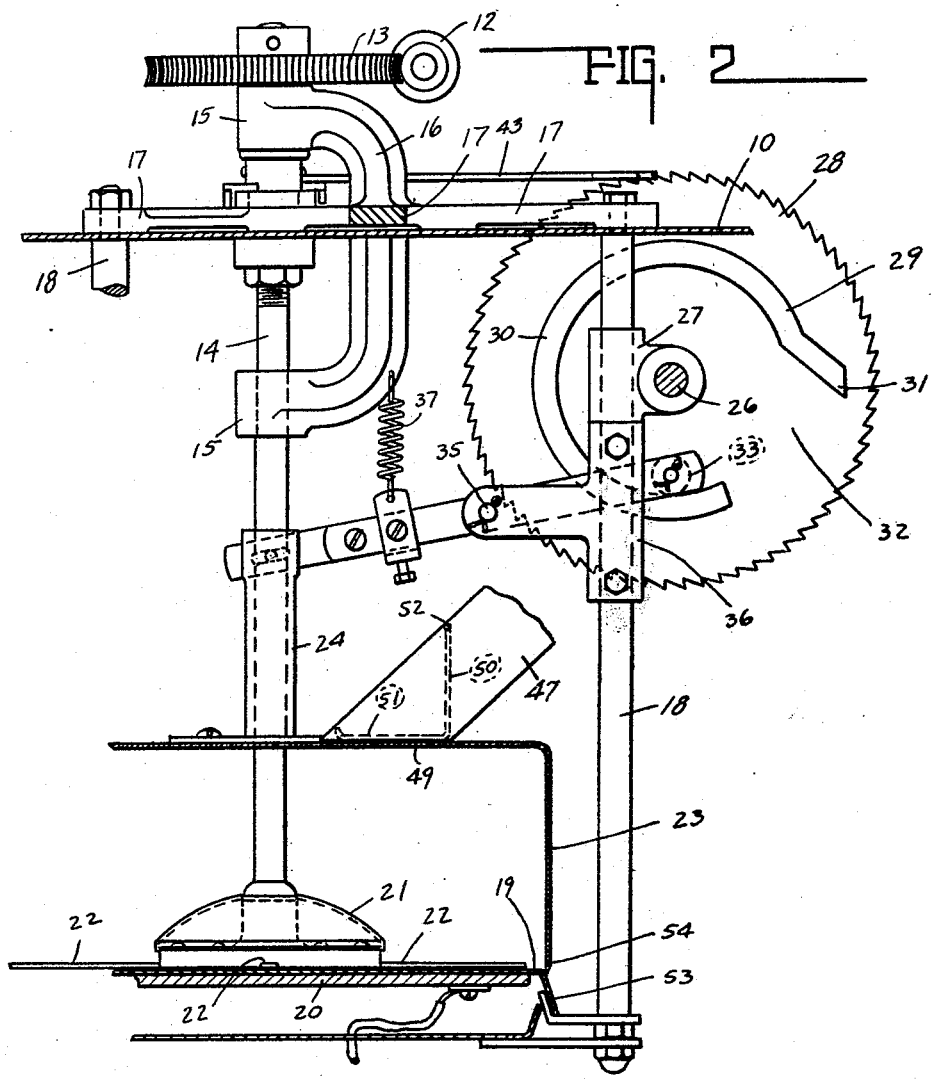
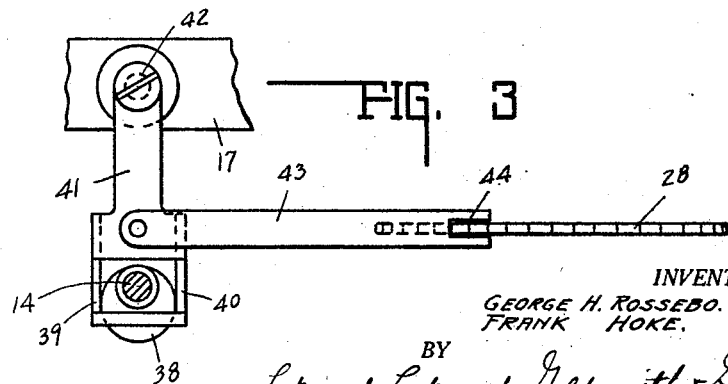
INVENTORS.
GEORGE H. ROSSEBO.
FRANK HOKE.
BY
ATTORNEYS.

Patented Aug. 11, 1931

1,818,276

UNITED STATES PATENT OFFICE

GEORGE H. ROSSEBO AND FRANK HOKE, OF INDIANAPOLIS, INDIANA, ASSIGNORS TO THE HOLCOMB & HOKE MFG. CO., OF INDIANAPOLIS, INDIANA, A CORPORATION

POP CORN MACHINE

Application filed May 10, 1930. Serial No. 451,285.

This invention relates to a corn popping machine and more particularly to that type of corn popping machine wherein a measured quantity of corn is periodically discharged upon a heated popping plate by automatic means and wherein the corn, when popped, is automatically discharged from said plate.

Heretofore it has been common practice to use a popping plate having a wall fixed thereto to prevent escape of the corn during popping and having a gate in said wall to be opened for the discharge of popped corn. With such a gate mechanism, a certain amount of time is required for the discharge of corn and often a kernel of corn lodges in such position that the gate is prevented from closing and all or part of the succeeding charge of pop corn escapes from the plate without being popped.

The principal object of the present invention is to provide apparatus whereby the corn may be discharged from the plate almost instantaneously about the entire periphery thereof and in which there is no danger of the next suceeding charge of unpopped corn escaping without popping.

The principal feature of the invention resides in the provision of a circular popping plate without side walls together with a cover having side walls and top and normally maintained in position over the popping plate to prevent discharge of corn therefrom. When a charge of corn has been popped, the entire cover is raised allowing the corn to be discharged about the periphery of the plate. The cover is then lowered and a new charge of corn is introduced upon the plate.

Another feature of the invention resides in the provision of an outwardly and downwardly sloping outer shoulder upon the popping plate with which the lower edge of the cover is adapted to engage. The said lower edge of the cover is preferably sharpened to provide a cutting edge for destroying any kernels of corn which may cling to the said portion of the popping plate. By this means, a kernel of corn engaging the edge of the cover in the lowering thereof will be either cut or burned in two in a sufficiently short time to allow the complete lowering of the cover before a new charge of corn is fed upon the plate.

Another feature of the invention resides in the provision of means for introducing corn upon the popping plate, said means being provided with an extremely simple type of gate mechanism for permitting the entrance of corn into the popping space and preventing the entrance of steam formed by the corn in the popping operation into the chute through which the corn is fed to the popping plate. If steam is allowed to enter the said chute, it condenses upon the inner surface thereof and prevents the easy flow of corn from the measuring apparatus to the plate. For that reason, it is important that the steam be excluded therefrom.

Other objects and features of the invention will be understood from the accompanying drawings and the following description and claims:

Fig. 1 is a perspective view of a pop corn machine embodying the invention. Fig. 2 is an elevational view with parts removed illustrating the formation of the popping plate cover and inlet gate. Fig. 3 is a detailed view in plan of a portion of the timing mechanism. Fig. 4 is a sectional view illustrating the position of the gate member during the introduction of corn to the popping plate. Fig. 5 is a sectional view illustrating the action of the cover member in engaging and destroying a kernel of corn clinging to the edge of the popping plate.

In the drawings the numeral 10 indicates a supporting member for the popping machine which may be the upper member of a glass-enclosed cabinet such as is commonly used for the manufacture of pop corn within view of purchasers. A motor 11 is mounted upon the supporting member 10. The motor 11 drives a worm 12 engaging a worm wheel 13 carried upon a vertical shaft 14. The shaft 14 is carried in bearings 15 forming a part of a casting 16 carried by the supporting member 10. The casting 16 has three outwardly-extending arms 17 from which are supported three downwardly-extending rods 18 in turn supporting a popping plate 19 having a heating element 20.

The shaft 14 carries at its lower end a hub member 21 having a plurality of arms 22 extending therefrom adjacent the surface of the popping plate 19 for agitating the corn during popping. A cover member 23 is carried by a cylindrical shank 24 slidably mounted upon the vertical shaft 14. The popping plate 19 is provided with a downwardly- and outwardly-extending flange 53 forming a frusto-conical surface. The cover member 23 is of circular form and of such diameter that the lower edge 54 engages the said frusto-conical surface when lowered to prevent discharge of corn. The edge 54 is preferably sharpened as illustrated to provide a cutting edge for destroying kernels of corn which may lodge between the said edge and flange 53. A horizontal shaft 26 is supported upon a bearing member 27 carried by one of the vertical rods 18. The shaft 26 carries a ratchet-toothed gear 28 upon the side of which is mounted a cam member 29. The said cam is formed with a portion 30 having the shape of an arc of a circle and an outwardly-extending portion 31. The cam is broken, providing a gap 32. A roller 33 is carried by a lever 34 and engages the inner surface of the cam 30. The lever 34 is pivotally supported upon a pin 35 carried by a bracket member 36 supported upon one of the rods 18. The opposite end of the lever 34 is pivotally connected to the upper end of the shank 24. A tension spring 37 is fastened at one end to a portion of the casting 16 and the opposite end is adjustably fastened to the lever 34.

The shaft 14 carries adjacent its upper end an eccentric 38 adapted to engage portions 39 and 40 of a lever member 41 pivotally mounted by means of a pin 42 upon one of the arms 17 of the casting 16. A link 43 is pivotally connected at one end to the lever 41 and has its opposite end formed in the shape of a fork 44 adapted to straddle the rim of the ratchet-toothed gear 28.

The bearing member 27 also carries a cylindrical casing 45 above which is mounted a container 46 for corn to be popped. The casing 45 contains measuring apparatus of any well-known form rotatable by means of the shaft 26 and adapted to receive a charge of corn from the container 46 and discharge the same into the upper end of a chute 47 at a predetermined point in the rotation of said shaft. The chute 47 is pivotally attached to the casing 45 by means of a pin 48 and the lower end of said chute rests upon the upper surface of the cover member 23 in position to discharge corn through an opening 49 in said cover member. At the lower end of the chute 47 there is provided a gate member having a vertical portion 50 and a horizontal portion 51 adapted to cover the opening 49. The upper end of the portion 50 is hinged by means of a pin 52 to the chute 47.

In the operation of the device, the motor 11 rotates the shaft 14 to rotate the agitating blades 22 during the popping of corn. The rotation of shaft 14 also rotates the eccentric 38 thereby oscillating the lever 41 about the pin 42. The link 43 is thereby reciprocated to advance the ratchet-toothed wheel 28 a desired distance for each reciprocation. The rotation of the wheel 28 rotates shaft 26 and causes the measuring apparatus within the casing 45 to discharge a measured quantity of corn into the upper end of the chute 47. The corn so discharged engages the vertical portion 50 of the gate member moving the said gate member to the position illustrated in Fig. 4. When the corn has entered the opening 49, the gate member returns by gravity to the position illustrated in Fig. 2 wherein the horizontal portion 51 covers the opening 49. In this position it will be seen that any steam which may escape about the sides of the portion 51 may escape into the atmosphere and will not pass into the chute 47, the opening to the said chute being protected by the vertical portion 50. Thus no condensation is formed within the chute 47 to hinder the passage of corn therethrough.

In the continued rotation of shaft 26, the gap 32 in the cam member 29 reaches the roller 33. The speed of the motor 11 and the proportions of the various parts are chosen so that this takes place at the time that the charge of corn has been fully popped. The roller 33 is thereupon free to move downwardly and the opposite end of the lever 34 is elevated by the spring 37. The cover 23 is raised thereby, allowing the popped corn to escape instantly about the edges of the popping plate 19. Thereafter the outwardly-extending portion 31 of cam 29 reaches the roller 32 and acts to elevate the same to lower the cover member 23. If at this time a kernel of corn 56 clings to the edge of the popping plate as shown in Fig. 5, it is engaged by the sharpened edge 54 of the cover member and is either cut in two thereby to permit seating of the cover member or is pressed tightly against the heating plate 19 and destroyed by burning. A complete seating of the cover member is thereby insured and the incoming charge of pop corn is prevented from escaping. An additional advantage of the complete seating of the cover member upon the flange 53 is due to the fact that the said member is accurately centered with respect to the popping plate 19 and is rigidly maintained in position. The shank member 24, therefore, forms an additional bearing member for the shaft 14 and prevents undesired vibration thereof.

The invention claimed is:

1. In a corn popping machine, the combination of a circular popping plate having a downwardly- and outwardly-extending flange, and a cover member having its lower edge of the proper diameter to engage said flange, said lower edge being sharpened to provide a cutting edge for destroying kernels of corn which may cling to said flange.

2. In a corn popping machine, the combination of a popping chamber having an opening therein, a chute for delivering corn to be popped to said opening, a gate member having a vertical portion hinged to said chute, and a horizontal portion adapted to cover said opening.

3. In a corn popping machine, the combination of a popping chamber having an opening therein, a chute for delivering corn to be popped to said opening, a gate member having a vertical portion hinged at its upper end to said chute, and a horizonal portion adapted to cover said opening.

4. In a corn popping machine, the combination of a popping chamber having an opening therein, a chute for delivering corn to be popped to said opening, a gate member having a portion adapted to close said chute, and a portion adapted to close said opening, both portions being movable from closing position by engagement of corn descending said chute with said chute closing portion.

In witness whereof, we have hereunto affixed our signatures.

FRANK HOKE.
GEORGE H. ROSSEBO.